United States Patent
Su

(10) Patent No.: US 9,959,399 B2
(45) Date of Patent: May 1, 2018

(54) AUTOMATIC INTELLIGENT LOCAL DEVICE FRAUD DETECTION

(71) Applicant: Citrix Systems, Inc., Fort Lauderdale, FL (US)

(72) Inventor: Jiawen Su, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 216 days.

(21) Appl. No.: 14/598,420

(22) Filed: Jan. 16, 2015

(65) Prior Publication Data
US 2016/0210450 A1    Jul. 21, 2016

(51) Int. Cl.
*G06F 21/31* (2013.01)
*H04L 29/06* (2006.01)
*G06F 21/88* (2013.01)
*H04W 12/12* (2009.01)
*G06F 21/55* (2013.01)

(52) U.S. Cl.
CPC .......... *G06F 21/316* (2013.01); *G06F 21/552* (2013.01); *G06F 21/88* (2013.01); *H04L 63/10* (2013.01); *H04W 12/12* (2013.01)

(58) Field of Classification Search
CPC ...... G06F 21/316; G06F 21/552; G06F 21/88; H04L 63/10; H04W 12/12
USPC .......................................................... 726/30
See application file for complete search history.

(56) References Cited

U.S. PATENT DOCUMENTS

| | | | |
|---|---|---|---|
| 2008/0059474 A1* | 3/2008 | Lim | G06F 17/3089 |
| 2009/0049544 A1* | 2/2009 | Kashi | H04L 9/3226 726/19 |
| 2013/0281113 A1* | 10/2013 | Schlaupitz | H04W 52/0254 455/456.1 |

FOREIGN PATENT DOCUMENTS

WO    03/094562 A1    11/2003

OTHER PUBLICATIONS

Wikipedia (2014) Relative change and difference. Retrieved Mar. 3, 2017 from http://web.archive.org/web/20140613150423/http://en.wikipedia.org/wiki/Relative_change_and_difference.*

(Continued)

*Primary Examiner* — Brian F Shaw
(74) *Attorney, Agent, or Firm* — Banner & Witcoff, Ltd.

(57) ABSTRACT

Methods, systems, computer-readable media, and apparatuses may provide a mobile device with the ability to locally detect fraudulent activity by an unauthorized user. A mobile device may include a fraud detection module that may build a historical usage pattern of a user of the mobile device. The fraud detection module may monitor usage of the mobile device for multiple parameters and record events pertaining to the parameters. Periodically or in response to each event, the fraud detection module may compute a current usage pattern using each of the current parameter values. The fraud detection module may compare the current usage pattern with the historical usage pattern and may use the comparison result to compute a confidence score. The fraud detection module may then compare the confidence score with a preset confidence score to determine whether fraudulent activity is occurring at the mobile device.

19 Claims, 4 Drawing Sheets

(56) References Cited

OTHER PUBLICATIONS

Pedro Ferreira et al.: "Establishing Fraud Detection Patterns Based on Signatures," Jan. 1, 2006, Advances in Data Mining Lecture Notes in Computer Science;Lecture Notes in Artificial Intelligence; LNCS; Springer, Berlin, DE, pp. 526-538, XP019037139, ISBN: 978-3-540-36036-0.

* cited by examiner

AUTOMATIC INTELLIGENT LOCAL DEVICE FRAUD DETECTION

FIELD

Aspects of the disclosure relate to computer hardware and software. In particular, one or more aspects of the disclosure generally relate to computer hardware and software for enabling a mobile device to locally detect fraudulent activity.

BACKGROUND

Smartphones store and/or have access to the owner's personal and work-related information. For instance, many smartphone owners store a vast amount of personal information on their smartphone such as financial information, address information, contacts, photos, texts, personal email, etc. Additionally, many companies have implemented bring your own device (BYOD) programs to save money by enabling employees to access work-related information using their personal smartphones. For example, the smartphone may store confidential information such as email, documents, spreadsheets, calendar, contacts, etc. Further, smartphones may have access to company databases and servers that may store a vast amount of other client confidential information.

Smartphone theft is becoming an increasingly common problem. Currently, mobile operating systems include few access protection features to prevent unauthorized persons from fraudulently accessing the smartphone. For example, many mobile operating systems include a lock code features that forces a user to enter an appropriate pin number in order to gain access to the smartphone. While this feature may prevent unauthorized access in some instances, most owners do not use such features since it requires them to enter the pin number each time they wish to access their smartphone, which can be numerous times a day for some people. Some smartphones have biometric access protection features such as a fingerprint scanner or facial recognition camera. While these features may be more convenient that lock codes, they can produce false positives thereby enabling access to the smartphone by an unauthorized person.

Once a thief or another unauthorized person gains access to the smartphone, they can change the smartphone's security settings to enable future access to the smartphone. For example, they can deactivate the lock code and possibly the biometric access features. Additionally, they may alter the security settings by, for example, providing a new lock code or a new biometric template for use with the fingerprint scanner or facial recognition camera.

Additionally, the thief or unauthorized person may obtain personal (e.g., financial) and/or work-related information stored on the smartphone or accessible by the smartphone. Exacerbating the situation is the fact that many mobile operating systems and mobile applications have settings that automatically store passwords thereby obviating any safeguards afforded by password protection.

One current "solution" is to remotely wipe the smartphone in order to remove all information. However, if the smartphone does not have a communications connection, the smartphone cannot receive the wiping instruction and, as a result, will not wipe the smartphone. Lastly, when a smartphone is stolen or accessed by an unauthorized person, the owner may mistakenly believe that the phone is lost and may spend hours looking for the phone before implementing a remote wipe solution (if it's available). During this time, the unauthorized person may access valuable personal and work-related information of the owner and may store this information on a storage device (e.g., a computer) for later use.

Accordingly, there is a persistent need to prevent unauthorized access to content stored on or accessible by smartphone devices.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Systems and methods are described for enabling a mobile device to automatically and locally detect fraudulent activity and/or unauthorized access by a user. For example, a mobile device may include a fraud detection module that may build a historical usage pattern of a user of the mobile device. The fraud detection module may monitor usage of the mobile device for multiple parameters and record user input events pertaining to the parameters in a recordation log. Periodically or in response to each event, the fraud detection module may compute a current usage pattern using each of the current parameter values stored in the recordation log. The fraud detection module may compare the current usage pattern with the historical usage pattern and may use the comparison result to compute a confidence score. The fraud detection module may then compare the confidence score with a preset confidence score to determine whether fraudulent activity is occurring at the mobile device.

In some embodiments, the usage patterns may be in the form of signatures (e.g., vectors). For example, in such embodiments, the historical usage pattern may be represented as a moving weighted average of the overall signature that includes a signature for each parameter (e.g., app parameters, location parameters, phone call parameters, email parameters, content-specific parameters, or any other parameters). The fraud detection module may monitor usage of the mobile device for each of the parameters and, in response to a usage event for a parameter, may record the event in a recordation log. The fraud detection module may, periodically or in response to each event, compute a signature for each parameter and may append and/or otherwise aggregate the signatures into an overall current signature of the parameters. The fraud detection module may then compare the current overall signature with the historical signature and may, using the comparison result, compute a confidence score. The fraud detection module may compare the confidence score with a preset confidence threshold to determine whether fraudulent activity is occurring at the mobile device.

In some embodiments, an apparatus may include a processor and a computer readable medium storing instructions that, when executed by the processor, cause the apparatus to perform a number of functions. For example, the apparatus may store multiple usage parameters associated with the apparatus. The multiple usage parameters may include an app usage parameter, a location parameter, and an in-app use parameter. The apparatus may store a first signature including a first set of parameters values for the multiple usage parameters based on a first set of user inputs. The apparatus may generate a second signature including a second set of parameter values for the multiple usage parameters based on a second set of user inputs. The apparatus may compare the second signature with the first signature and may generate a confidence score for the second signature based on the comparison. The apparatus may, in response to a determination that the confidence score is greater than a preset maximum score threshold, identify the second set of user inputs as being fraudulent. The apparatus may, in response to a determination that the confidence score is less than or equal to the preset maximum score threshold, identify the second set of user inputs as being not fraudulent.

In some embodiments, the apparatus may generate a first signature representative of a historical usage pattern of the apparatus by an authorized user based on a first set of parameter values. The apparatus may receive, via one or more input interfaces, one or more inputs from a user. The apparatus may generate a second set of parameters values based at least in part on the one or more inputs of the user. The apparatus may generate a second signature representative of a usage pattern of the apparatus by the user based on the second set of parameter values. A plurality of parameters may be associated with the first set of parameter values and the second set of parameter values. The apparatus may determine whether the user is an unauthorized user based on the whether the second signature is different from the first signature beyond a preset difference threshold.

In some embodiments, the apparatus may receive, via one or more input interfaces, one or more user inputs from a user. The apparatus may then determine a set of parameter values for each usage parameter of multiple usage parameters associated with the apparatus based on the one or more user inputs. The apparatus may generate a vector for each usage parameter based on the corresponding set of parameter values and may append the vectors to form an overall vector representative of the one or more user inputs. The apparatus may then determine whether the user is an unauthorized user based at least on a comparison of the overall vector with a historical vector associated with usage of the apparatus by an authorized user.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which.

DETAILED DESCRIPTION

In the following description of the various embodiments, reference is made to the accompanying drawings, which form a part hereof, and in which is shown by way of illustration various embodiments in which a fraud detection management solution may be practiced. It is to be understood that other embodiments may be utilized and structural and functional modifications may be made without departing from the scope of aspects discussed herein. The fraud detection management system is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
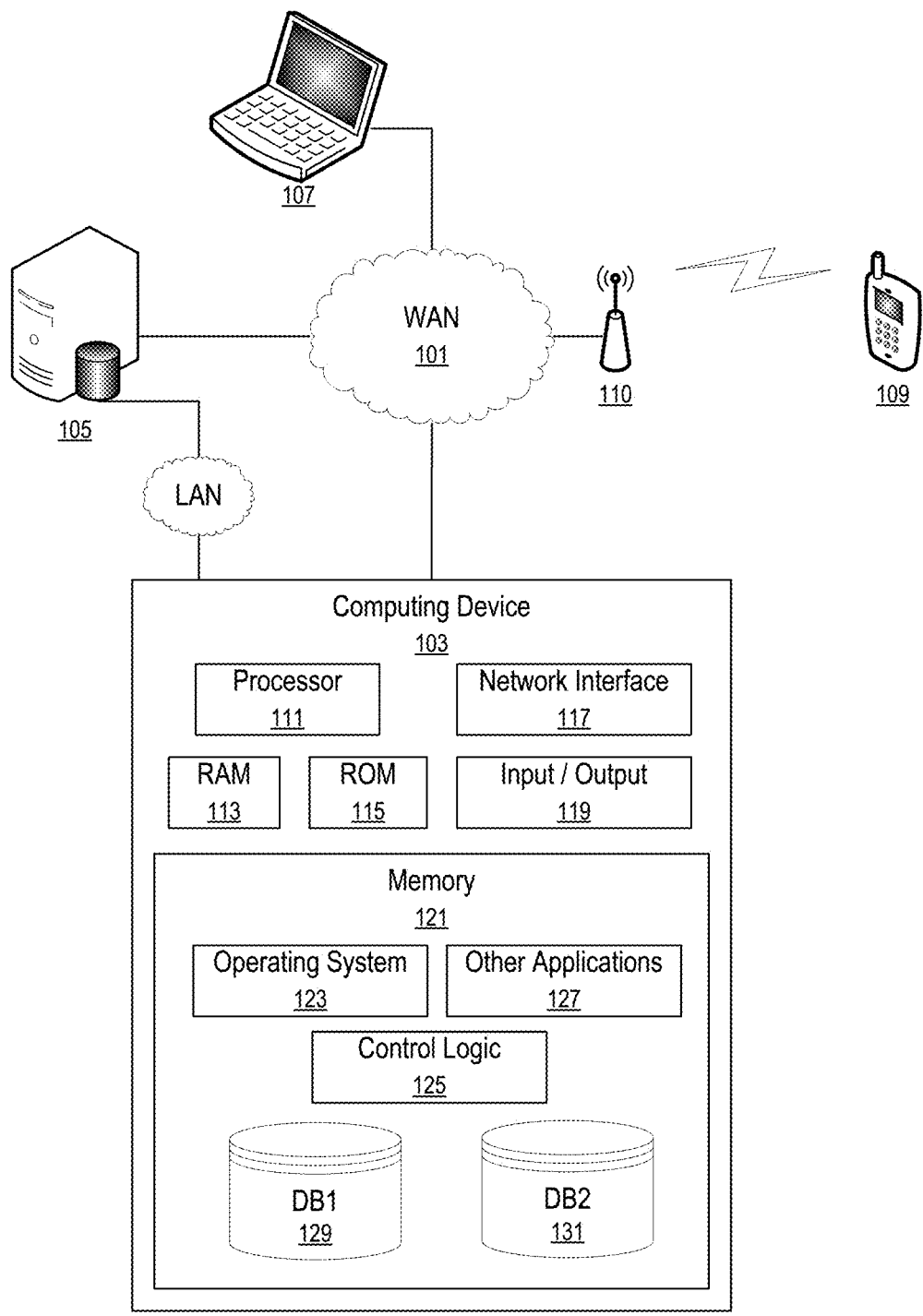
FIG. 1 depicts an illustrative network architecture and data processing device that may be used to implement one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media. One or more devices (e.g., device 109) may be connected using a cellular connection with base station 110 that is communicatively coupled to WAN 101 to communicate with the other devices.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device and may have the same components as data server 103. Data server 103, e.g., may include a processor 111 controlling overall operation of the data server 103. Data server 103 may further include RAM 113, ROM 115, network interface 117, input/output interfaces 119 (e.g., keyboard, mouse, touchscreen display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with aspects discussed herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the fraud detection management system may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein.

The fraud detection management system may be implemented using the network architecture described in FIG. 1. For example, the fraud detection system may be implemented via one or more of the data server 103, the web server 105, and/or the client computers 107, 109.

Figure 2:
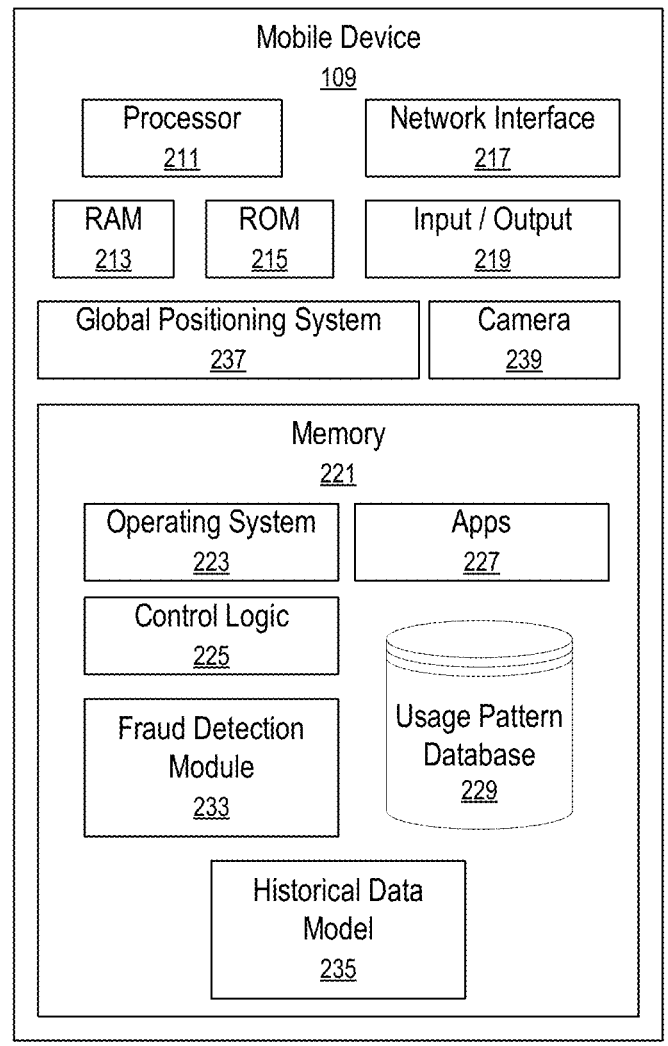
FIG. 2 depicts an illustrative mobile device that may be used to implement one or more illustrative aspects described herein.

FIG. 2 depicts an illustrative mobile device that may be used to implement one or more illustrative aspects described herein. For example, mobile device 109 may include a processor 211, RAM 213, ROM 215, network interface 217, input and output interfaces 219 (e.g., a touchscreen display, stylus, physical buttons, audio input, audio output, etc.), memory 221, mobile operating system 223 (e.g., iOS, android, windows, Linux, etc.), and control logic 225 that may each be configured as discussed above in FIG. 1. Additionally, memory 121 may store one or more apps 227 (e.g., mobile applications). Mobile device 109 may also include a global position system (GPS) sensor 237 configured to determine the geographic location (e.g., latitudinal and longitudinal coordinates) of mobile device 109. Mobile device 109 may include an optical sensor such as camera 239 that may generate photographs of physical objects.

Mobile device 109 may also include fraud detection module 233, a usage profile database 229, and a historical data model 235. Fraud detection module 223 may generate a historical usage pattern of mobile device 109. Fraud detection module 233 may monitor usage of mobile device 109 for multiple parameters and record events pertaining to the parameters in a recordation log stored in usage pattern database 229. Periodically or in response to each event, fraud detection module 233 may compute a current usage pattern using one or more of the current parameter values stored in the recordation log. Fraud detection module 233 may compare the current usage pattern with the historical usage pattern stored in usage pattern database 229 and may use the comparison result to compute a confidence score. Fraud detection module 233 may then compare the confidence score with a preset confidence score to determine whether fraudulent activity is occurring at mobile device 109.

In some embodiments, the usage patterns may be in the form of signatures. For example, in such embodiments, the historical usage pattern may be represented as a moving weighted average of the overall signature that includes a signature for each parameter (e.g., app parameters, location parameters, phone call parameters, email parameters, content-specific parameters, or any other parameters discussed in further detail below). Fraud detection module 233 may monitor a user's usage of mobile device 109 for each of the parameters and, in response to a usage event for a parameter (e.g., a user input corresponding to a parameter), may record the event in a recordation log. Fraud detection module 233 may, periodically or in response to each event, compute a signature for each parameter and may append and/or otherwise aggregate the signatures into an overall current signature of the parameters. The fraud detection module 233 may then compare the current overall signature with the historical signature and may, using the comparison result, compute a confidence score of the overall current signature. The fraud detection module 233 may compare the confidence score with a preset maximum confidence score threshold to determine whether fraudulent activity has occurred at the mobile device.

Fraud detection module 223 may retrieve numerous usage parameters from usage pattern database 229 and monitor usage of the mobile device for such parameters. The usage parameters may include app usage parameters, in-app use parameters, location parameters, phone call parameters, content-specific parameter, content-specific parameters, or any other parameters.

App usage parameters may include numerous parameters relating to the usage of different apps (e.g., mobile applications) installed on mobile device 109. For example, one app usage parameter may be the most frequently used apps. Another app usage parameter may be for the most frequently used application categories (e.g., games, social networks, movies, pictures, music, work-related applications, email, contacts, financial apps, etc.). Another app usage parameter may be for the number times each app is opened and/or otherwise accessed over a preset time period. Another app usage parameter may be a parameter to track the distribution of the number of times an app is opened or used by day of week and/or hour of day. For example, a user (e.g., owner) of mobile device 109 may habitually access a particular app on the weekend that she might not habitually access during the work week, or vice-versa. Another app usage parameter may be for the app use duration (e.g., how long a particular app has remained opened either in a foreground and/or a background context).

In-app use parameters may include numerous parameters relating to use of an app's features. For example, in an email app, an in-app use parameter may be a parameter for the average number of emails accessed by a user over a preset time period. Another parameter may be for the number of older emails accessed by a user (e.g., the number of accessed emails that are at least two weeks old, one-month old, etc.). Another parameter may be for the percentage of older emails accessed relative to all accessed emails. In a financial app, an in-app usage parameter may be a parameter for the number of financial accounts accessed in a financial app over a preset period of time.

Location parameters may include numerous parameters relating to the geographical locations of mobile device 109. A location parameter may be for the distance between a current or new geographic location of mobile device 109 and a previous or past geographic location. In some instances, the past geographic location may be a common geographic location of mobile device 109 (e.g., above a preset frequency threshold). A location parameter may be for most frequent or least frequent geographic locations of mobile device 109. In some instances, one or more of the location parameters may be specific to a day of the week and/or time of day.

Phone parameters may include numerous parameters relating to features of a mobile phone. For example, a phone parameter may be a parameter for the number of incoming and outgoing calls on a per-day or per-hour basis. For example, a phone parameter may be a parameter for how frequently and at what time of day mobile device 109 receives an incoming call from a particular contact or telephonic number. Another parameter may be for how frequently and at what time of day mobile device 109 sends an outgoing call to a particular contact or telephonic number. Another phone parameter may be for short message service (SMS) messages and may include the same information (e.g., to or from whom, timestamp, frequency, etc.) as the phone call parameter discussed above. Another phone parameter may be for multimedia message service (MMS) messages and may include the same information (e.g., to or from whom, timestamp, frequency, etc.) as the phone call parameter discussed above.

Content-specific parameters may include numerous parameters relating to specifically identified content. For example, a content-specific parameter may be a parameter for a particular financial account, a particular email, a particular app, or other designated information. In some embodiments, the content-specific parameter may be preset by an authorized user of the device (e.g., an owner of the device, an employer of the owner in a bring your own device (BYOD) environment, etc.).

In some embodiments, mobile device 109 receives fraud detection module 233 and the information stored in the usage pattern database 229 (e.g., parameters, confidence score thresholds discussed below, etc.) from the data server 103.

The historic data model 235 may be an analyzed set of data stored in the recordation log. Historic data model 235 may include a summary of one or more common past locations of mobile device 109. For example, the recordation log may include a list of each past geographic location of mobile device 109. Historical data model 235 may analyze this list to determine the most frequent or common geographic locations of mobile device 109. Further, historical data model 235 may include a list of triggers to determine whether fraudulent activity is occurring at mobile device 109. For instance, one trigger may be triggered and/or otherwise activated when mobile device 109 is determined to be more than a preset distance (e.g., 50 miles) from a closest common location of mobile device 109. When triggered, fraud detection module 233 may determine a usage profile of mobile device 109 and compare the usage profile to a historical usage profile to determine whether an unauthorized person is using mobile device 109.

In some embodiments, the fraud detection management system may periodically update one or more preset values and/or thresholds described herein based on periodic analysis. For example, a remote server (e.g., data server 103) may aggregate user behaviors and update a preset confidence threshold based on the results of the analysis. The remote server may send the updated preset confidence threshold to the mobile device 109 for use by its fraud detection module 233. While the preset confidence threshold was described above, any of the preset values or thresholds discussed herein (e.g., preset difference threshold, etc.) may be updated in a similar manner.

Figure 3:
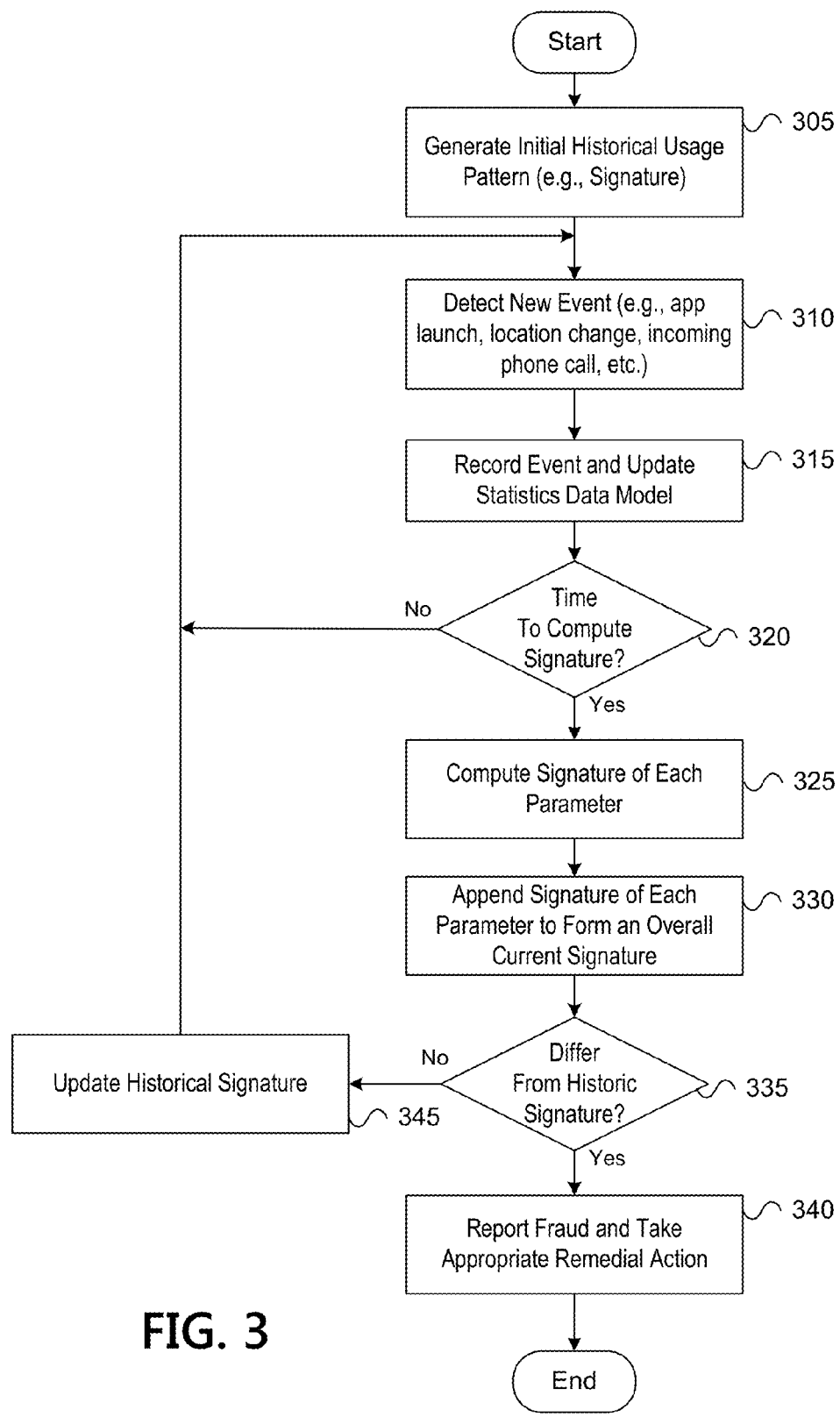
FIG. 3 depicts an illustrative method to detect fraudulent activity that may be used to implement one or more illustrative aspects discussed herein.

FIG. 3 depicts an illustrative method to detect fraudulent activity that may be used to implement one or more illustrative aspects discussed herein. In one or more embodiments, the method of FIG. 3 and/or one or more steps thereof may be performed by a computing device (e.g., mobile device 109). In other embodiments, the method illustrated in FIG. 3 and/or one or more steps thereof may be embodied in computer-executable instructions that are stored in a computer-readable medium, such as a non-transitory computer-readable memory. In some instances, one or more of the steps of FIG. 3 may be performed in a different order. In some instances, one or more of the steps of FIG. 3 may be omitted and/or otherwise not performed.

As seen in FIG. 3, the method may begin at step 305 in which mobile device 109 may generate an initial historical usage pattern (e.g., an initial historical signature). For example, in step 305, fraud detection module 233 may generate an initial overall signature of the current usage of mobile device 109. For example, fraud detection module 233 may compute a signature for each preset usage parameter stored in usage pattern database 229 and may append and/or otherwise aggregate each of the signatures to form an overall signature of the usage pattern for mobile device 109 (also discussed in further detail below).

In one or more embodiments, the initial historical signature may be computed in the following manner. Fraud detection module 233 may record the current usage for mobile device 109. For example, for a preset time period (e.g., 3 hours), fraud detection module 233 may record usage of mobile device 109 in a recordation log as parameter values for one or more parameters discussed herein (e.g., location parameters, app use parameters, in-app use parameters, content-specific parameters, or any other parameters). After the preset time period has elapsed, fraud detection module 233 may compute a signature for each parameter and append the signatures to form an overall signature of the current usage of mobile device 109 (discussed in further detail below). The signatures may be in the form of sets of data items (e.g., values, numbers, scalars, etc.) such as vectors or arrays.

In one example, usage pattern database 229 includes an app usage parameter and a location parameter. The app usage parameter may correspond to the number of times each app is opened and/or otherwise accessed at mobile device 109 by a user or another application. In this example, six total apps are installed on mobile device 109. During a 3-hour preset time period, the user accesses four of the six apps. For example, the user accessed the first app 4 times, the third app 1 time, the fourth app 2 times, and the fifth app 4 times. Additionally, during the same 3-hour preset period, the sixth app was accessed once by another application (e.g., one of the other 5 apps or an application on a remote computing device). Lastly, during the same 3-hour preset period, the second app might not have been accessed by either the user or another application. Fraud detection module 233 may generate a signature S1 for the app usage parameter to represent the number of times each app was opened or accessed at mobile device 109. For example, S1 may equal the following vector: [4, 0, 1, 2, 4, 1]. In this example, the location parameter may represent the distance (e.g., in miles, kilometers, etc.) between the most recently recorded geographic location and common past geographic location of mobile device 109. For example, fraud detection module 233 may, using the recordation log, determine one or more common geographic locations of mobile device 109. Fraud detection 233 may then determine a distance between the current or most recent geographic location of mobile device 109 with one or more of its common geographic locations. In this example, the distance may be 10 miles and the signature S2 of this parameter may equal the following vector: [10], which, in this instance, is a vector having only one scalar value. Fraud detection module 233 may append the signatures S1 and S2 to generate an overall signature (e.g., an initial historical signature) of the usage of mobile device 109. For example, the overall signature S3 may equal [S1, S2] or [[4, 0, 1, 2, 4, 1], 10]. As will be discussed in further detail below, fraud detection module 233 may update the historical usage signature. After a number of updates, in this example, the updated historical signature may be [[4.2, 0, 0.9, 2.1, 4.1, 1.2], 10.4]. The values of the parameters may be any one of a number of different data types (e.g., integers, double, float, string, etc.). In this example, the historical signature may contain values having the double data type.

In step 310, fraud detection module 233 may monitor usage of mobile device 109 for each of the parameters. For example, in step 310, fraud detection module 233 may detect new usage events of the mobile device that pertain to a parameter stored in usage pattern database 229 and, in step 315, may record the event in a recordation log stored at usage pattern database 229 and update the statistics data model 235.

For example, in step 310, mobile device 109 may receive one or more inputs (e.g., a set of user inputs) from a user. Example inputs include opening an app, moving mobile device to another geographic location, using a feature of app, etc. Fraud detection module 233 may determine if input has a corresponding parameter and, if so, may record a parameter value representative of the input in the recordation log.

As noted above, app usage parameters may include the number of times each app is accessed, the most frequently or least frequently accessed apps, etc. Thus, each time an app is accessed at mobile device 109, fraud detection module 233 may record that the app was accessed by the user in the recordation log and determine a value that represents the total number of time the app was accessed in a preset time period (e.g., since the last signature was generated). Fraud detection module 233 may rank the apps of the mobile device based on how frequently the app is used by the user of mobile device 109. Fraud detection module 233 may also record the how long the app remains open, the time and day the app when the app was opened, etc.

As noted above, in-app parameters relate to features of a particular app (e.g., an email app). Each time the app is used, fraud detection module 233 may record the particular in-app use (e.g., that an email over 2 weeks old was opened, that 6 financial accounts in a financial app have been accessed, etc.) in the recordation log and update the parameter values of the recordation log.

For location parameters, fraud detection module 233 may periodically or continuously retrieve the geographic location of mobile device 109 from GPS sensor 237. Fraud detection module 233 may record the geographic location of mobile device 109 in the recordation log along with a time of day and day of the week identifiers (e.g., 2 pm on Saturday). Over time, fraud detection module 233 may identify and/or otherwise determine geographic locations or areas that mobile device 109 is commonly and/or otherwise frequently disposed within. Additionally, fraud detection module 233 may, using the recordation log, identify when mobile device 109 is at a new geographic location (e.g., a location mobile device 109 might not have been before) and may record identify the geographic location as new in the recordation log. Further, fraud detection module 233 may determine and record the distance between the new location and one or more of the frequented geographic locations/areas. Further, fraud detection module 233 may determine and record the frequency mobile device 109 is located at each geographic location to determine the most and least frequent locations of mobile device 109. Thus, when mobile device 109 moves from location to location, fraud detection module 233 records its location and identifies whether the location is new or a common past location.

For phone parameters, fraud detection module 233 may track incoming/outgoing calls, SMS messages, MMS messages, or the like. Additionally, fraud detection module 233 may track who is sending the call or message and who is receiving the call or messages. Further, fraud detection module 233 may track the day of the week, time of day, and frequency of the calls and messages. Because the recordation log is kept locally stored on mobile device 109 (e.g., mobile device 109 might not send the recordation log to another device), mobile device 109 maintains the privacy of the user and her contacts. Thus, when mobile device 109 receives an incoming phone call or sends an outgoing phone call, fraud detection module 233 may record who the call is from or sent to, the time, and the day (e.g., call received from contact Brian at 2 pm on Saturday) and maintain privacy of the user's and contact's personal information. While a number of parameters have been described above, other additional parameters may be monitored and recorded by fraud detection module 233.

Once a usage event for a parameter (e.g., a parameter value) has been recorded in the recordation log, in step 320, fraud detection module 233 may determine whether it is time to compute a signature (e.g., a usage pattern) for mobile device 109 using the parameter values in the recordation log. For example, fraud detection module 233 may periodically compute a signature for the usage of mobile device 109. For instance, fraud detection module 233 may compute the signature only after a preset time period (e.g., 3 hours) has elapsed since the generation of the previous signature. If, after the event has been recorded, fraud detection module 233 has determined that it has been less than 3-hours since the last the signature was generated by fraud detection module 233, then it may determine not to compute a new signature at this time and instead may return to monitoring for usage events (e.g., repeating steps 310-320). If however, fraud detection module 233 determines that at least 3 hours have elapsed since the last signature was computed, then it may determine to generate and/or otherwise compute a current signature. Alternatively, in some embodiments, fraud detection module 233 may compute a signature after each triggered event.

In step 325, fraud detection module 233 may compute a current signature for each usage parameter using parameter values in the recordation log. Following the example discussed above in connection with step 305 in which there are six apps installed on mobile device 109 and two parameters (e.g., the app usage parameter, and the location parameter for the distance from common geographic locations), fraud detection module 233 may, using the recordation log, determine that since the last signature was generated, the first app was opened 3 times, the second app might not have been opened, the third app was opened 1 time, the fourth app was opened 2 times, the fifth app was opened 4 times, and the sixth app was opened 1 time. In some instances, a user of mobile device 109 opened or accessed one or more of the apps. In some instances, another application (e.g., an app installed on mobile phone 109 or an application at a remote computing device) opened or accessed one or more of the apps. Fraud detection module 233 may generate a signature S4 for the app usage parameter, which may be the following vector: [3, 0, 1, 2, 4, 1].

Further, fraud detection module 233 may, using the recordation log, determine that the current or most-recently recorded geographic location of mobile device 109 is 5 miles from the closest common geographic location). For instance, fraud detection module 233 may determine geographic locations or areas that mobile device 109 is frequently or commonly located at or disposed within using the recordation log (e.g., above a frequency level threshold). Fraud detection module 233 may also identify when the current or most-recently recorded geographic location of mobile device 109 might not be at or near its common geographic locations. In response, fraud detection module 233 may determine a distance between the current geographic location and the closest common geographic location. Additionally or alternatively, another parameter may be the distance between a new geographic location of mobile device 109 and its common geographic irrespective of whether the new geographic location is the current or most-recently recorded geographic location (e.g., the new geographic location might not be the current or most-recently recorded geographic location). In one example, fraud detection module 233 may, using the recordation log, determine that the distance between the current geographic location of mobile device 109 and its common past geographic locations is 5 miles. Fraud detection module 233 may then compute a signature S5 the location parameter for current distance from common past locations, which may be the following vector: [5].

Once fraud detection module 233 has generated and/or otherwise computed a signature for each parameter, then, in step 330, fraud detection module 233 may generate an overall usage signature of mobile device 109 by appending or aggregating each of the signatures into a single overall signature. Following the above example in which there are only two parameters (e.g., an app usage parameter and a location parameter), fraud detection module 233 may generate overall current signature S6 by appending signatures S4 and S5 resulting in the following: [[3, 0, 1, 2, 4, 1], 5].

In step 335, fraud detection module 233 may determine whether the overall current signature representing the current usage of mobile device 109 is significantly different from the current historic signature (e.g., the initial historic signature discussed above). This determination may be indicative of whether an authorized or unauthorized user is using mobile device 109. For example, if the authorized user is the owner of mobile device 109, then the current historical signature may represent the authorized user's habitual usage of mobile device 109. If the overall current signature is not significantly different from the current historical signature, then the authorized user is likely using mobile device 109 since the same user is likely to habitually use mobile device 109 in the same manner (e.g., a person's current use of a device is likely consistent with her prior habitual use of the device). If the overall current signature is significantly different from the current historic usage signature, then an unauthorized user may be fraudulently using mobile device 109 since the current usage pattern differs significantly from the habitual usage pattern of the authorized user.

The determination of whether two signatures are significantly different may be determined in a number of ways. In one example, fraud detection module 233 may compare the overall current signature with the current historic signature and compute an absolute value of a difference between each value of the current historic signature and its corresponding value of the overall current signature and check to see the resulting difference value is less than or equal to a corresponding preset maximum difference value store in usage pattern database 229. In the above example, the current historical signature may be the vector [[4.2, 0, 0.9, 2.1, 4.1, 1.2], 10.4] and the overall current signature may be the vector [[3, 0, 1, 2, 4, 1], 5]. In this example, the preset maximum difference value for the number times the third app is opened may be 0.1 times. Fraud detection module 233 may determine that the absolute difference value between 1 and 0.9 is 0.1 and, thus, may determine that this difference value may be within the preset maximum difference value. As a result, the overall current signature for this value may be considered consistent with (e.g., not significantly different from) the current historical signature. However, the preset maximum difference value for number of times the first app is opened may be 1 time. Fraud detection module 233 may determine that the absolute difference value between the 4.2 and 3 is 1.2 and, thus, may determine that this difference value might not be within the preset maximum difference value. As a result, the overall current signature for this value may be inconsistent with (e.g., significantly different from) the current historical signature. In some instances, a ratio of values that are consistent relative to the total number of values may be above a preset ratio (stored in usage pattern database 229) in order for the overall current signature to be considered not significantly from the current historical signature. In some instances, all of the values of the signatures may have to be consistent in order for the two signatures to be considered not significantly different from one another.

Figure 4:
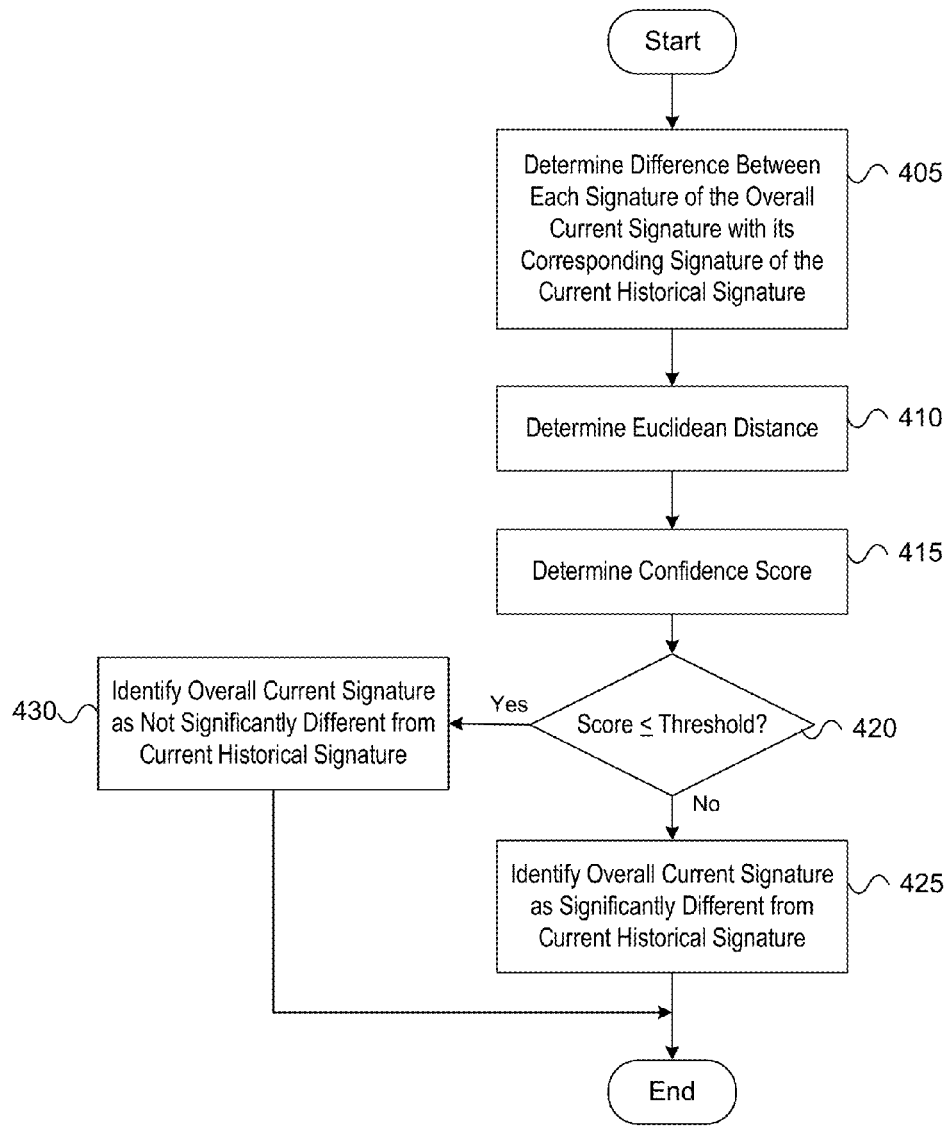
FIG. 4 depicts an illustrative method to determine the difference between the overall current signature and the historical signature.

FIG. 4 depicts another example of a method for determining whether the overall current signature is significantly different from the current historical signature. In one or more embodiments, the method of FIG. 4 and/or one or more steps thereof may be performed by a computing device (e.g., mobile device 109). In other embodiments, the method illustrated in FIG. 4 and/or one or more steps thereof may be embodied in computer-executable instructions that are stored in a computer-readable medium, such as a non-transitory computer-readable memory. In some instances, one or more of the steps of FIG. 4 may be performed in a different order. In some instances, one or more of the steps of FIG. 4 may be omitted and/or otherwise not performed.

As seen in FIG. 4, the method may begin at step 405 in which fraud detection module 233 may determine the difference between each signature of the overall current signature with its corresponding signature of the current historical signature using the following formula:

$$d_1(X,Y) = \Sigma_i |x_i - y_i| \text{ and } d_\infty(X,Y) = \max_i(|x_i - y_i|)$$

In the above formula, $d_1$ and $d_\infty$ may represent two distances of a signature's vector. In the above example, the current historical signature may be the vector [[4.2, 0, 0.9, 2.1, 4.1, 1.2], 10.4] and the overall current signature may be the vector [[3, 0, 1, 2, 4, 1], 5]. The distance between the app usage signature S4 (e.g., vector [3, 0, 1, 2, 4, 1]) and its corresponding signature of the current historical signature (e.g., vector [4.2, 0, 0.9, 2.1, 4.1, 1.2]) may be |3−4.2|+|0−0|+|1−0.9|+|2−2.1|+|4−4.1|+|1−1.2|=1.2+0+0.1+0.1+0.1+0.2=1.7, which may be referred to as the app usage signature difference value. The distance between the location signature S5 (e.g., vector [5]) and its corresponding signature of the current historical signature (e.g., vector [10.4]) may |5−10.4|=5.4, which may be referred to as the location signature difference value.

In step 410, fraud detection module 233 may use the signature difference values to compute Euclidean distance between overall current signature and the current historical signature using the following formula:

$$ED(u,v) = \sqrt{(x_1 - y_1)^2 + (x_2 - y_2)^2 + \ldots + (x_n - y_n)^2}$$
$$= \sqrt{\sum_{i=1}^{n}(x_i - y_i)^2}$$

Applying the formula to the above example, the square root of $(1.7^2+5.4^2)=5.66$, which may be referred to as the overall signature's difference value. In an alternative embodiment, fraud detection module 233 may use the vector cosine angle distance (VCAD) formula to determine Euclidean distance:

$$VCAD(u,v) = \frac{\sum_i x_i y_i}{\sqrt{\sum_i x_i^2}\sqrt{\sum_i y_i^2}} = \frac{u \cdot v}{\|u\|\|v\|}$$

Applying the formula to signature S4 (e.g., vector [3, 0, 1, 2, 4, 1]) and its corresponding signature of the current historical signature (e.g., vector [4.2, 0, 0.9, 2.1, 4.1, 1.2]), VCAD may equal $(3*4.2+0+1*0.9+2*2.1+4*4.1+1*1.2)/((\sqrt{3^2+0+1+2^2+4^2+1}) * (\sqrt{3^2+0+0.9^2+2.1^2+4.1^2+1.2^2})) = 0.9888$ (e.g., the app usage signature difference value). Using the above-determined location signature difference value of 5.4, the overall Euclidean distance may be the square root of $(0.9888^2+5.4^2)=5.49$. In one or more embodiments, fraud detection module 233 may select which of the distance formulas to use based on data recorded in the recordation log.

In step 415, fraud detection module 233 may determine a confidence score of the overall current signature. For example, in step 415, the confidence score may be determined using the following formula (e.g., ratio):

$$Score = \frac{\text{Current Signature Difference Value (e.g., Euclidean Distance)}}{\text{Average Signature Difference Value Over Past } X \text{ Signatures}}$$

In one example, X may be the value 10 and the average signature difference value over the past 10 computed signature difference values may be the value 6.4. Fraud detection module 233 may compute the confidence score by dividing 5.66 by 6.4 resulting in a confidence score of 92.79%. Following the above alternative embodiment, fraud detection module 233 may calculate the confidence score by dividing 5.49 by 6.4.

In step 420, fraud detection module 233 may determine whether the confidence score is less than or equal to a preset maximum threshold confidence score. In one example, the preset maximum threshold confidence score is 200%. Thus, fraud detection module 233 may determine that 92.79% is less than 200% and, in response, may identify the overall current signature as not being significantly different from the current historical signature in step 430. Additionally or alternatively, in some embodiments, fraud detection module 233 may identify the current usage of mobile device 109 as being consistent with an authorized user (e.g., not a fraudulent usage pattern). Additionally, fraud detection module 233 may use a time-decayed weighted average to update the average signature difference value by determining a new average signature difference value over the past 10 signatures including the current signature difference value for the overall current signature for future determinations of the confidence score. In some embodiments, fraud detection module 233 may determine a signature value difference range by recording the difference between the current signature difference value and the average signature difference value for optional use in updating the preset confidence threshold or updating the average signature difference value.

In another example, fraud detection module 233 may determine that the confidence score is 322% and that 322% is greater than the 200% preset maximum threshold confidence score. In response, fraud detection module may, in step 425, identify the overall current signature as being significantly different from the current historical signature. Additionally or alternatively, fraud detection module 233 may identify the current usage of mobile device as being inconsistent with the authorized user and, thus, mobile device 109 may likely be being fraudulently used by an unauthorized user. The confidence score may be greater than the preset maximum threshold confidence score when, for example, one or more of the six apps are being opened or accessed either significantly more or less frequently than what the authorized user habitually has done in the past. Additionally or alternatively, the confidence score may be greater than the preset maximum threshold confidence score when, for example, mobile device 109 has moved to a new geographic location that is a large distance away from its closest common past geographic locations. In this instance, the confidence score indicates that mobile device 109 is likely being used by an unauthorized person since mobile device 109 is being used in manner inconsistent with the habitual use of the authorized user.

In some embodiments, the sensitivity of whether the overall current signature is different from the current historical signature may be adjusted by adjusting the maximum confidence score threshold.

Returning to FIG. 3, if, in step 335, fraud detection module 233 determines that the overall current signature is significantly different from the current historical signature, then, in step 340, fraud detection module 233 may report the fraudulent activity to a remote server (e.g., data server 103), if possible. For example, fraud detection module 233 may determine that mobile device 109 may communicate with another computing device, such as, data server 103 (e.g., via a cellular signal, WIFI, Bluetooth, etc.) and, in response, may transmit a report indicating that mobile device 109 may be being fraudulently used by an unauthorized user. In some instances, mobile device 109 may receive an acknowledgement message from data server 103 indicating whether mobile device 109 is being fraudulently used by an unauthorized user. In some instances, if the acknowledgement message indicates that mobile device 109 may be being used by an authorized user (e.g., not fraudulently user), fraud detection module 233 might not perform one or more remedial actions discussed below. In some instances, fraud detection module 233 might not be able to report the fraud to data server 103 when, for example, mobile device 109 is not an area that has a wireless communication signal. In some embodiments, fraud detection module 233 may determine that mobile device 109 has various communication transceivers (e.g., antennas, etc.) in an inactive state (e.g., WIFI is off, data signal is off, and/or mobile device 109 is in airplane mode, etc.). In response, fraud detection module 233 may activate one or more of the communication transceivers (e.g., turn on WIFI, turn on data signaling, turn off airplane mode, etc.) to attempt to establish a wireless link with data server 103. In some instances, mobile device 109 might not alert the user as to the activation of the transceivers.

Fraud detection module 233 may also take one or more appropriate remedial actions. A list of different remedial actions may be stored in usage pattern database 229. Remedial actions may include preventing access (e.g., locking) one or more apps of mobile device 109 and/or locking mobile device 109 itself. The user of mobile device 109 may then have to provide authentication credentials to either mobile device 109 or to a remote entity (e.g., a web server) in order to unlock the apps and/or mobile device 109. In some instances, fraud detection module 233 might not unlock the app and/or device until it receives an authentication acknowledgement from the remote computing device. The authentication credentials may include any number of items including, for example, password, pin, biometric information (e.g., fingerprint, facial recognition, etc.), or the like. In some embodiments, if the user does not authenticate herself within a preset period of time (e.g., 48 hours), fraud detection module 233 may wipe (uninstall and remove) one or more apps from mobile device 109. Alternatively, fraud detection module 233 may wipe mobile device 109 entirely. In some instances, fraud detection module 233 may "brick" mobile device 109 and/or otherwise render mobile device 109 permanently unusable. Additionally, in some embodiments, mobile device 109 may continuously or periodically output an audible or visual alert to notify the user that she needs to authenticate herself, the remedial action that may occur if the user does not authenticate herself, and the time left to do so before the remedial action occurs.

If, in step 335, fraud detection module 233 determines that the overall current signature is not significantly different from the current historical signature (e.g., mobile device 109 is being used by an authorized user), then, in step 345, fraud detection module 233 may update the current historical signature using any number of methods so that the historical signature remains current. In one example, fraud detection module 233 may individually update each parameter of the current historical signature by employing an exponentially weighted moving average (EWMA) model, which may be represented by the following formula:

$$Xn=\theta*Dc+(1-\theta)*Xp$$

In the above equation, Xn may represent the new parameter value for the corresponding element of the updated historical signature's vector, Xp may represent the previous signature parameter value (e.g., the parameter value of the element in the overall current signature), Dc may represent data collection (e.g., the current parameter value for the corresponding element in the historical signature), and $\theta$ may represent an incorporation rate to define the weighting of the moving average.

In the above example, the current historical signature may be the vector [[4.2, 0, 0.9, 2.1, 4.1, 1.2], 10.4] and the overall current signature may be the vector [[3, 0, 1, 2, 4, 1], 5]. Additionally, fraud detection module 233 may determine that the incorporation rate $\theta$ may be the value 0.85 or 85% so (1−$\theta$) may equal 0.15 or 15%. Applying the above formula to the first element (corresponding to the number of times the first app is opened) of each signature, fraud detection module 233 may determine that Xn may equal 0.85 multiplied by 4.2 plus 0.15 multiplied by 3, which equals 4.02. Thus, the first element of the updated current historical signature may be the value 4.02. Fraud detection module 233 may perform the same analysis for each element in the vectors. As a result, the updated or new current historical signature may be the vector [[4.02, 0, 0.915, 2.085, 4.085, 1.17], 9.59] for use with comparison with the next overall current signature. Fraud detection module 233 may store the updated current historic signature in usage pattern database 229. By updating the current historic signature each time fraud detection module 233 determines that mobile device 109 is being used by an authorized user, the historic signature may account for incremental changes in habitual usage of mobile device 109 by the authorized user.

In one or more arrangements, the incorporation rate may account for a discount of data after a preset number of updates to the historical signature. For example, fraud detection module 233 may determine how much older data should account for in the updated current historical signature. For example, if a data influence from 30 time periods ago (e.g., 30 updates ago) has a weight of 1.0, then fraud detection module 233 may apply the formula) $1.0*(\theta^{30})$ to determine what percentage the data older than 30 updates is accounted for in the overall current update to the historical signature. In this instance $1.0*(\theta^{30})=1.0*(0.85^{30})=0.007631$ and, thus, the older data (e.g., data from over 30 updates ago) accounts for less than 0.8% of the overall result in the current historical signature. Additionally or alternatively, in some embodiments, fraud detection module 233 may determine the incorporation rate or weightings using neural network learning.

Once the current historic signature has been updated, fraud detection module 233 may return to monitoring for usage events corresponding to one or more of the parameters stored in usage pattern database 229. For example, fraud detection module 233 may continue to repeat steps 310-345 to detect fraudulent use of mobile device 109 and to maintain an up-to-date historical signature.

Using the above methodologies, fraud detection module 233 may locally determine when mobile device 109 begins to send or receive phone calls, SMS messages, MMS messages, access emails, access financial accounts in a manner that is inconsistent with habitual use of mobile device 109 by the authorized user. In such instances, fraud detection module 233 may locally take appropriate remedial measures to protect information stored at or accessible by mobile device 109 from the unauthorized user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. An apparatus comprising:
    a communication transceiver;
    a hardware processor; and
    a computer readable medium storing instructions that, when executed by the hardware processor, cause the apparatus to:
        store a plurality of usage parameters associated with the apparatus, wherein the plurality of usage parameters includes an app usage parameter, a location parameter, and an in-app use parameter;
        store a first signature including a first set of parameter values for the plurality of usage parameters based on a first set of user inputs;
        generate a second signature including a second set of parameter values for the plurality of usage parameters based on a second set of user inputs;
        compare the second signature with the first signature to determine a signature difference value representative of a difference between the first signature and the second signature;
        compute an average signature difference value over a plurality of past signature difference values associated with usage of the apparatus;
        generate a confidence score for the second signature based at least on a ratio of the signature difference value to the average signature difference value;
        if the confidence score is greater than a preset maximum score threshold,
            identify the second set of user inputs as being fraudulent; and
        in response to determining that the communication transceiver is in an inactive state, activate the communication transceiver without alerting a user of the apparatus and establish a communication link with a remote server; and
        if the confidence score is less than or equal to the preset maximum score threshold, identify the second set of user inputs as being not fraudulent and update the average signature difference value based on the signature difference value.

2. The apparatus of claim 1, wherein the computer readable medium stores instructions that, when executed by the hardware processor, further cause the apparatus to:
    if the confidence score is greater than the preset maximum score threshold, prevent access to one or more functions of the apparatus by the user;
    receive, from a remote computing device, an acknowledgement indicating that the user is an authorized user of the apparatus; and
    in response to the receiving, permit access to the one or more functions of the apparatus by the user.

3. The apparatus of claim 1, wherein the computer readable medium stores instructions that, when executed by the hardware processor, further cause the apparatus to:
    if the confidence score is less than or equal to the preset maximum score threshold, update the first signature based on the second signature.

4. The apparatus of claim 3, wherein the computer readable medium stores instructions that, when executed by the hardware processor, further cause the apparatus to:
    generate a third signature including a third set of parameter values for the plurality of usage parameters based on a third set of user inputs;
    compare the third signature with the updated first signature;
    generate a different signature difference value based on the comparing of the third signature with the updated first signature;
    generate a different confidence score for the third signature based on a ratio of the different signature difference value to the updated average signature difference value;
    in response to a determination that the different confidence score is greater than the preset maximum score threshold, identify the third set of user inputs as being fraudulent; and
    in response to a determination that the different confidence score is less than or equal to the preset maximum score threshold,
        update the updated first signature based on the third signature; and
        update the updated average signature difference value based on the different signature difference value.

5. The apparatus of claim 1, wherein the computer readable medium stores instructions that, when executed by the hardware processor, further cause the apparatus to:
    generate a first set of signatures for the plurality of usage parameters; and
    appending each signature of the first set of signatures to generate the second signature.

6. The apparatus of claim 1,
    wherein the app usage parameter is a parameter for a number to times each app installed at the apparatus is opened or accessed by a user or an application;
    wherein the location parameter is a parameter for a distance between a current geographic location of the apparatus and a previous geographic location of the apparatus; and wherein the in-app use parameter is a parameter for a number of emails opened or accessed by the user.

7. An apparatus comprising:
a communication transceiver;
a hardware processor; and
a computer readable medium storing instructions that, when executed by the hardware processor, cause the apparatus to:
generate a first signature representative of a historical usage pattern of the apparatus by an authorized user based on a first set of parameter values;
receive, via one or more input interfaces, one or more inputs from a user;
generate a second set of parameters values based at least in part on the one or more inputs of the user;
generate a second signature representative of a usage pattern of the apparatus by the user based on the second set of parameter values, wherein a plurality of parameters is associated with the first set of parameter values and the second set of parameter values;
determine a signature difference value representative of a difference between the first signature and the second signature;
compute an average signature difference value over a plurality of past signature difference values associated with usage of the apparatus;
generate a confidence score for the second signature based at least on a ratio of the signature difference value to the average signature difference value;
if the confidence score is greater than a preset maximum score threshold,
identify the user as being an unauthorized user; and
in response to determining that the communication transceiver is in an inactive state, activate the communication transceiver without alerting the user of the apparatus and establish a communication link with a remote server; and
if the confidence score is less than or equal to the preset maximum score threshold, identify the user as the authorized user and update the average signature difference value based on the signature difference value.

8. The apparatus of claim 7, wherein the computer readable medium stores instructions that, when executed by the hardware processor, further cause the apparatus to:
if the user is the unauthorized user, prevent access to one or more functions of the apparatus by the user.

9. The apparatus of claim 7, wherein the computer readable medium stores instructions that, when executed by the hardware processor, further cause the apparatus to:
if the user is the authorized user, update the first signature based on the second signature using an exponentially weighted moving average.

10. The apparatus of claim 7, wherein the signature difference value is a Euclidean distance between the first signature and the second signature, and wherein the average signature difference value is an average Euclidean distance.

11. The apparatus of claim 7, wherein the computer readable medium stores instructions that, when executed by the hardware processor, further cause the apparatus to:
determine a plurality of signatures, wherein each signature is based on a parameter of the plurality of parameters; and
append the plurality of signatures to generate the second signature.

12. The apparatus of claim 7, wherein the computer readable medium stores instructions that, when executed by the hardware processor, further cause the apparatus to:
determine whether to generate the second signature based on whether a preset time period has elapsed since a previous signature was generated.

13. The apparatus of claim 7, wherein the first signature is a first vector and the second signature is a second vector.

14. The apparatus of claim 7, wherein at least one parameter, of the plurality of parameters, is a parameter for one of: a number of times an app installed at the apparatus is opened by the user or a distance between a geographic location and a previous geographic location of the apparatus.

15. An apparatus comprising:
a communication transceiver;
a hardware processor; and
a computer readable medium storing instructions that, when executed by the hardware processor, cause the apparatus to:
receive, via one or more input interfaces, one or more user inputs from a user;
determine a set of parameter values for each usage parameter of a plurality of usage parameters associated with the apparatus based on the one or more user inputs;
generate a vector for each usage parameter based on the corresponding set of parameters values;
append the vectors to form an overall vector representative of the one or more user inputs;
generate a signature difference value based at least on a comparison of the overall vector with a historical vector associated with usage of the apparatus by an authorized user;
compute an average signature difference value over a plurality of past signature difference values associated with usage of the apparatus;
generate a confidence score based on a ratio of the signature difference value and the average signature difference value;
if the confidence score is greater than a preset maximum score threshold,
determine that the user is an unauthorized user; and
in response to determining that the communication transceiver is in an inactive state, activate the communication transceiver without alerting the user of the apparatus and establish a communication link with a remote server; and
if the confidence score is less than or equal to the preset maximum score threshold, determine that the user is the authorized user.

16. The apparatus of claim 15, wherein the computer readable medium stores instructions that, when executed by the hardware processor, further cause the apparatus to:
update the historical vector based on the overall vector.

17. The apparatus of claim 15, wherein the plurality of usage parameters includes an app usage parameter, a location parameter, and an in-app use parameter.

18. The apparatus of claim 17,
wherein the app usage parameter is a parameter for a number to times each app installed at the apparatus is opened or accessed by the user or an application;
wherein the location parameter is a parameter for a distance between a current geographic location of the apparatus and a previous geographic location of the apparatus; and
wherein the in-app use parameter is a parameter for a number of emails opened or accessed by the user.

19. The apparatus of claim 15, wherein the computer readable medium stores instructions that, when executed by the hardware processor, further cause the apparatus to:
  determine whether to generate the vector based on whether a preset time period has elapsed since a previous vector was generated.

* * * * *